US008977754B2

(12) United States Patent
Curry, Jr. et al.

(10) Patent No.: US 8,977,754 B2
(45) Date of Patent: Mar. 10, 2015

(54) COMPOSITE PUBLIC CLOUD, METHOD AND SYSTEM

(75) Inventors: Steven Lynn Curry, Jr., Los Angeles, CA (US); Sean Patrick Lynch, Burbank, CA (US)

(73) Assignee: Metacloud Inc., Chatsworth, CA (US)

( * ) Notice: Subject to any disclaimer, the term of this patent is extended or adjusted under 35 U.S.C. 154(b) by 205 days.

(21) Appl. No.: 13/466,685

(22) Filed: May 8, 2012

(65) Prior Publication Data

US 2012/0290460 A1 Nov. 15, 2012

Related U.S. Application Data

(60) Provisional application No. 61/484,178, filed on May 9, 2011.

(51) Int. Cl.
*G06F 15/173* (2006.01)
*G06Q 30/08* (2012.01)
*G06F 9/06* (2006.01)

(52) U.S. Cl.
CPC . *G06Q 30/08* (2013.01); *G06F 9/06* (2013.01)
USPC ........................................................ 709/226

(58) Field of Classification Search
CPC .................................. G06F 9/06; G06Q 30/08
USPC ........................................................ 709/226
See application file for complete search history.

(56) References Cited

U.S. PATENT DOCUMENTS

| | | | |
|---|---|---|---|
| 6,178,453 B1 | 1/2001 | Mattaway | |
| 8,301,746 B2 * | 10/2012 | Head et al. ................... | 709/223 |
| 8,448,171 B2 * | 5/2013 | Donnellan et al. ............. | 718/1 |
| 2009/0293056 A1 * | 11/2009 | Ferris ............................. | 718/1 |
| 2009/0300608 A1 * | 12/2009 | Ferris et al. ................... | 718/1 |
| 2010/0061250 A1 | 3/2010 | Nugent | |
| 2011/0016214 A1 | 1/2011 | Jackson | |
| 2011/0055396 A1 * | 3/2011 | Dehaan ........................ | 709/226 |
| 2011/0185063 A1 * | 7/2011 | Head et al. .................... | 709/226 |
| 2012/0072318 A1 | 3/2012 | Akiyama et al. | |
| 2012/0084445 A1 * | 4/2012 | Brock et al. .................. | 709/226 |
| 2012/0297238 A1 * | 11/2012 | Watson et al. ............... | 714/4.11 |
| 2013/0117337 A1 * | 5/2013 | Dunham ...................... | 707/827 |

FOREIGN PATENT DOCUMENTS

TW M394537 12/2010

* cited by examiner

*Primary Examiner* — Lance L Barry
(74) *Attorney, Agent, or Firm* — Michael A. Glenn; Perkins Coie LLP

(57) ABSTRACT

A composite public cloud enables an automated marketplace system for, selling and trading of computational resources by aggregating available compute resources so that buyers are automatically matched with sellers. A listing of compute resources available on a prospective seller's system and bids by prospective buyers for resources offered is maintained. A seller uses a series of attributes to characterize an available resource for prospective buyers. Compute resources are presented in a form which can be easily quantified or compartmentalized. Prospective buyers search the marketplace system based on desired resource criteria. The marketplace continually evaluates the attributes of resources available for sale and the desired criteria of prospective buyers. The system attempts to match buyers and sellers, optimizing for the needs of both parties. If a desirable match is found, the marketplace system facilitates a transaction between both parties, making the purchased resource available to the buyer.

18 Claims, 7 Drawing Sheets

Billing Overview

Logged in as: admin  Settings  Sign Out

Select a month to query its usage:

[April] [2012] [Submit]

Active Instances: 4 Active Memory: 2GB This Month's VCPU-Hours: 0.51 This Month's GB-Hours: 0.00

[Download CSV Summary] — 5002

Tenant Billing Summary

| Project ID | Project Name | VCPUs | Disk | RAM | VCPU Hours | RAM GB Hours | Disk GB Hours |
|---|---|---|---|---|---|---|---|
| 145872e5c1a941a29005e605b966f8f6 | Test Project | 1 | - | 512MB | 0.05 | 0.03 | 0.00 |
| 876bea29adc548f5b4c5941bef9627e5 | admin | - | - | - | 0.00 | 0.00 | 0.00 |
| aa59a1fa99e4471aab01ad93a2b367f6 | demo | 3 | - | 1GB | 0.46 | 0.24 | 0.00 |

Displaying 3 items openstack DASHBOARD
Project  Admin  Billing
Summary

Tenant Summary
(aa59a1fa99e4471aab01ad93a2b367f6)

Select a month to query its usage:
April | 2012 | Submit

Active Instance Usage Summary — 6002

| Instance ID | Instance Name | Size | VCPU Hours | RAM GB Hours | Disk GB Hours |
|---|---|---|---|---|---|
| - | ex-vol | 512MB RAM \| 1 VCPU \| 0 Disk | 0.14 | 0.07 | 0.00 |
| - | test_instance | 512MB RAM \| 1 VCPU \| 0 Disk | 0.13 | 0.06 | 0.00 |
| - | ex-vol | 512MB RAM \| 1 VCPU \| 0 Disk | 0.11 | 0.06 | 0.00 |

Displaying 3 items

Terminated Instance Usage Summary — 6004

| Instance ID | Instance Name | Size | VCPU Hours | RAM GB Hours | Disk GB Hours |
|---|---|---|---|---|---|
| - | test_instance | 512MB RAM \| 1 VCPU \| 0 Disk | 0.03 | 0.02 | 0.00 |
| - | test_vol_instance | 512MB RAM \| 1 VCPU \| 0 Disk | 0.02 | 0.01 | 0.00 |
| - | Server 3 | 512MB RAM \| 1 VCPU \| 0 Disk | 0.00 | 0.00 | 0.00 |
| - | ex-float | 512MB RAM \| 1 VCPU \| 0 Disk | 0.01 | 0.00 | 0.00 |
| - | ex-vol | 512MB RAM \| 1 VCPU \| 0 Disk | 0.03 | 0.02 | 0.00 |
| - | test_instance | 512MB RAM \| 1 VCPU \| 0 Disk | 0.00 | 0.00 | 0.00 |
| - | Server 7 | 512MB RAM \| 1 VCPU \| 0 Disk | 0.00 | 0.00 | 0.00 |
| - | ex-float | 512MB RAM \| 1 VCPU \| 0 Disk | 0.00 | 0.00 | 0.00 |
| - | Server 11 | 512MB RAM \| 1 VCPU \| 0 Disk | 0.00 | 0.00 | 0.00 |
| - | ex-float | 512MB RAM \| 1 VCPU \| 0 Disk | 0.00 | 0.00 | 0.00 |

Displaying 10 items

FIG. 6

COMPOSITE PUBLIC CLOUD, METHOD AND SYSTEM

CROSS REFERENCE TO RELATED APPLICATIONS

This application claims benefit of U.S. provisional patent application Ser. No. 61/484,178, filed May 9, 2011, the entirety of which is incorporated herein by this reference thereto.

BACKGROUND DISCUSSION

1. Technical Field

Generally, the invention relates to cloud computing. More particularly, the invention relates to a method and system for creating a composite public cloud.

2. Description of Related Technology

Recently, a model for delivering hosted services over the Internet as emerged that has come to be known as "cloud computing". The term "cloud computing" flows naturally from the cloud symbol that is often used to represent the Internet or other network in various diagrams. The hosted services fall into a handful of categories, for example: Infrastructure-as-a-Service (IaaS), Platform-as-a-Service (PaaS) and Software-as-a-Service (SaaS).

Cloud computing has several characteristics that distinguish it from traditional hosting. It is available on demand, often by the minute or the hour, for example. A user can have as much or as little of a service as they need or want at a time. Additionally, the service is managed by the provider. Cloud computing owes its development to advances in virtualization and distributed computing, coupled with continually increasing opportunities for high-speed Internet access.

In general, there exist public and private clouds, with the public clouds making computational resources available to all corners. In contrast, a private cloud is usually privately-owned and run and serves a limited population of users, for example the employees of a large corporation that owns the compute infrastructure. Additionally, virtual private clouds can be created from public cloud resources.

Infrastructure as a service is a way of taking individual physical servers and virtualizing them in such a way that one may have, for example, a thousand physical servers, upon which virtualization software may be overlaid. The virtualization application can, in its turn, present those thousand physical servers as, for example, 10,000 virtual servers. Within these virtual servers one can then run his or her corresponding enterprise applications. Thus, virtualizing previously physical resources is known as infrastructure service.

SUMMARY

A composite public cloud enables an automated marketplace system for buying, selling and trading of computational resources by aggregating available compute resources so that buyers are automatically matched with sellers. A listing of compute resources available on a prospective seller's system and bids by prospective buyers for resources offered is maintained. A seller uses a series of attributes to characterize an available resource for prospective buyers. Compute resources are presented in a form which can be easily quantified or compartmentalized. Prospective buyers search the marketplace system based on desired resource criteria. The marketplace continually evaluates the attributes of resources available for sale and the desired criteria of prospective buyers. The system attempts to match buyers and sellers, optimizing for the needs of both parties. If a desirable match is found, the marketplace system facilitates a transaction between both parties, making the purchased resource available to the buyer.

BRIEF DESCRIPTION OF THE DRAWINGS

FIG. 5 provides a screenshot of a first view of a user dashboard;

FIG. 6 provides a screenshot of a second view of a user dashboard; and

DETAILED DESCRIPTION

Figure 1:
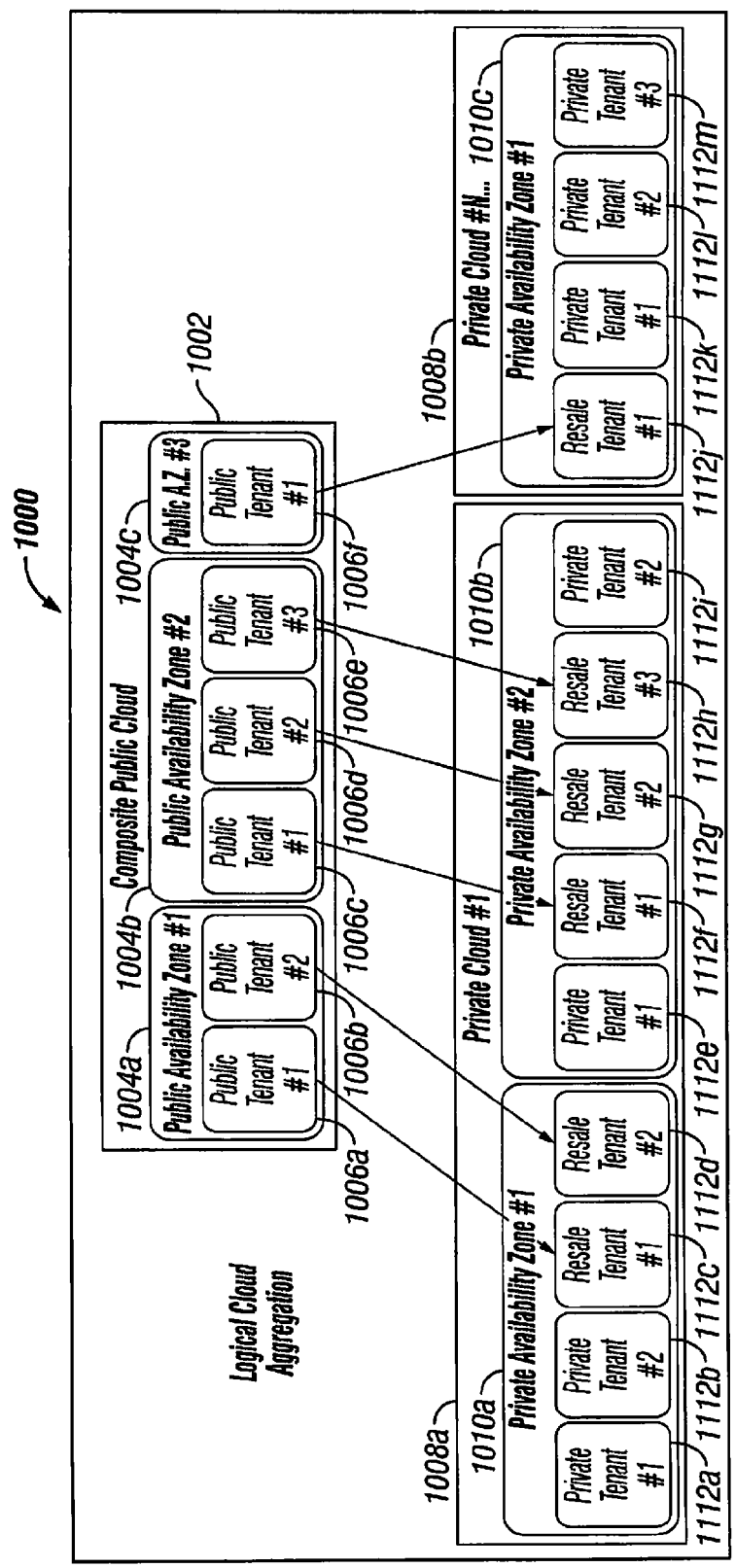
FIG. 1 provides a schematic diagram of a logical private cloud aggregation.

A composite public cloud enables an automated marketplace system for, selling and trading of computational resources by aggregating available compute resources so that buyers are automatically matched with sellers. A listing of compute resources available on a prospective seller's system and bids by prospective buyers for resources offered is maintained. A seller uses a series of attributes to characterize an available resource for prospective buyers. Compute resources are presented in a form which can be easily quantified or compartmentalized. Prospective buyers search the marketplace system based on desired resource criteria. The marketplace continually evaluates the attributes of resources available for sale and the desired criteria of prospective buyers. The system attempts to match buyers and sellers, optimizing for the needs of both parties. If a desirable match is found, the marketplace system facilitates a transaction between both parties, making the purchased resource available to the buyer.

Managed Private Cloud

In an embodiment, the marketplace described above presupposes a reliable inventory of compute to offer for sale in the marketplace. In an embodiment, the inventory is the compute and the storage and everything else that's part of the cloud. If the compute is to be offered in the marketplace as a commodity, the supply must be reliable and the quality good. In an embodiment, the solution to the problem of obtaining an adequate inventory of acceptable quality is to offer only compute that has been managed and operated by the provider.

Conventional cloud computing is based on the public cloud model, described in greater detail herein below, wherein subscriber's or clients purchase compute from services providers that provide expansive public networks. While the conventional public cloud model readily makes compute available to parties who have none or who are in need of more compute than they have the resources for, and provides the additional advantage of providing full management of the subscribed, it has the distinct disadvantage of being quite costly. In fact, an organization can install and manage its own data center for a fraction of the cost of the same compute capacity purchased from a cloud computing provider. Unfortunately, the organization is then faced with the formidable burden of managing its own private cloud. Thus, there exists a great need in the art for a solution to the problem posed by the expense of public cloud providers and the burden of managing a private cloud.

In an embodiment, a service provider contracts with organizations or parties having physical servers in data centers to design and implement private clouds in their data centers that are then fully managed by the service provider. Additionally, the service provider sets up an IaaS (infrastructure as a service) offering in the data center. Thus, the organization is able to dedicate a portion of its compute to public tenants, in effect creating a public cloud that can then be aggregated with the same type of public compute from other parties into a Composite Public Cloud, as described herein below. Therefore, by leasing a portion of its compute to public tenants through the Composite Public Cloud, the organization is able to convert a traditional cost center into a profit center. In addition, the cost to maintain its own private cloud is a fraction of the cost to acquire equivalent compute from public cloud providers. In an embodiment, the service may employ a subscription business model, wherein clients may pay on a per-server basis for cloud management from the service provider. It will be readily appreciated that other business models are equally suitable.

In review, the MANAGED PRIVATE CLOUD service provides:
  Realization of benefits of large-scale private-cloud computing while minimizing risks and costs;
  Fully-managed dedicated private cloud;
  24/7 monitoring;
    Well-trained, readily-available support personnel;
  Multitenant;
  Rich UI and APIs based on OPENSTACK;
  No licensing fees;
  Nominal subscription fees; and
  Open platform, no vendor lock-in.

In an embodiment, the various components of the managed private cloud are implemented via OPENSTACK open source cloud computing software. In particular, the virtualized networking is a function of an OPENSTACK project known as NOVA NETWORKING, also OPENSTACK COMPUTE. NOVA is the software that controls an Infrastructure as a Service (IaaS) cloud computing platform. NOVA does not include any virtualization software, but instead defines drivers that interact with underlying virtualization mechanisms that run on a host operating system, and exposes functionality over a web API (application programming interface). Additionally, a self-service dashboard is a function of OPENSTACK DASHBOARD.

Marketplace/Composite Public Cloud

As above, managed private cloud clients may make their underutilized compute resources available for sale, in effect using a portion of their private clouds to create public clouds, which as above, may be aggregated to form a Composite Public Cloud. Companies can come and purchase resources like compute and storage, which resources are provided by the managed private cloud customers, giving them an opportunity to leverage their excess resources and to generate a cash flow or a revenue stream from their private cloud. In an embodiment, the Composite Public Cloud is, in actuality, a virtualized cloud aggregated from all these portions of these various private clouds.

In addition to reducing the client's cloud computing costs and providing an opportunity to generate cash flow from the data center, the above model also solves the service provider's problem of sourcing compute inventory for the Composite Public Cloud. The inventory constitutes the compute, the storage and everything else that is part of the cloud.

By sourcing compute inventory from its own managed-private-cloud clients, the service provider is assured of a steady inventory of compute of known quality. By supplying inventory of known quality that the provider has managed, the provider is able to provide a reliable, repeatable experience to customers purchasing compute through the Composite Private Cloud.

Compute Quality Management (Normalization and Standardization)

Essential to the creation of a vibrant compute resale marketplace, compute inventory must be created. To function as a commodity, compute inventory must be quantifiable, measurable and deterministic. By first managing the compute seller's (Private) cloud, low-level measurement and quality constraints can be put in place. Private Cloud management software guarantees quality of service via network (QoS), compute orchestration and workload management. Performance data is continually streamed from the private cloud to the central market, so that compute consumption can be further metered in the interest of performance control.

Compute Segregation and Security

New sold inventory is segregated and encapsulated as to not present a security risk to the Private Cloud tenants or prior sold inventory. Compute containment occurs by means of packet inspection and filtering at all layers of the network stack.

Calculated Attributes of a Private Cloud

Compute resources have a series of associated attributes for the purpose of describing the quality of the resource available for sale. A multitude of dynamically derived data will be continuously streamed to the central Market Place control logic, which will include at least one of:
  Network (To/From Private Cloud, Between Private Clouds);
  Latency;
  Communication Quality;
  Available Inventory;
  Hypervisor CPU, Memory, Disk data;
  Availability of Compute Peripherals (GPU, Hardware, Crypto); and
  Cost.

Compute Inventory Management
  Central Market Place control logic maps available inventory into sellable lots of compute over time, either via Compute Unit Hours (CUh) or through a series of multidimensional constructs each containing CPU, Disk, Memory (i.e. a typical VM sizing) over time. Compute over time will be treated as sellable "lots". A sellable lot will have at least one of the following attributes:
  Start of availability;
  Grace Period;
  Cost; and
  Optional Minimal Duration.

Grace Period denotes the minimum amount of time the Private Cloud Provider is required to give to the purchaser, in the event purchased compute must be terminated and reclaimed. Longer grace periods will likely translate into higher market values. By default, all compute is considered perpetual (until terminated by either party);

In an embodiment, the Market Logic tracks all contracts (lot-sold time to "delivery") and the percentage of time a contract is delivered without interruption (up to the grace period). This percentage is made available to the compute lot purchaser as a measure of quality (so that it can be considered alongside the asking price). Contract success percentage also affects market price.

In an embodiment, the marketplace system maintains a listing of both compute resources available for sale on a prospective seller's system and bid requests, by prospective buyers, for resources offered. In this regard, the marketplace functions as a compute resource aggregator or intermediary.

Compute Commodity Exchange, Speculative Buying and Trading

In an embodiment, the contract holder can utilize a compute lot at "start of availability", but prior to such time contracts can be bought and sold freely. In an embodiment, the contacts are traded on a compute commodity exchange and may be freely bought and sold in speculative transactions on the exchange.

Inventory Presentation Layer and VM Placement Semantics

- A consumer-facing portal presents available inventory as a "Public Cloud";
- Consumers may use the portal to both purchase contracts and associated purchased contracts with Virtual Machines;
- The Portal may cache Virtual Machines and ultimately place them in the associated Private Cloud at the contract's "Start of Availability";
- If a virtual machine is inadvertently terminated, market logic attempts to buy a contract for equal or lesser cost and duration, placing the last cached copy of the VM in the next viable Private Cloud; and
- VMs need not migrate between Private Clouds. In an embodiment, the flow may be from the Central Market to the original contract seller's cloud.

In an embodiment, prospective buyers may search the marketplace system, via automated or manual means, based on desired resource criteria. The marketplace continually evaluates the attributes of resources available for sale and the desired criteria of prospective buyers. The system attempts to match buyers and sellers, optimizing for the needs of both parties. Assuming a desirable match is found, the marketplace system facilitates a transaction between both parties, ultimately making the purchased resource available to the seller.

Turning now to FIG. 1, a schematic diagram of a logical private cloud aggregation 1000 is shown. In an embodiment, a Composite Public Cloud 1002 is formed by aggregating excess compute from private clouds #1-N 1008*a*, 1008*b*. As shown in FIG. 1, each of the private clouds comprises at least one availability zone. Private cloud #1 1008*a* includes private availability zones 1 and 2 1010*a*, 1010*b*. Private cloud #N includes, for example, one private availability zone 1010*c*. The ordinarily-skilled person will understand that the configuration of private clouds and the private availability zones is for illustration only. In actual fact, a private cloud could have a large number of availability zones, as described below. Going back to FIG. 1, one can see that private availability zone #1 1010*a* of private cloud #1 1008*a* contains multiple tenants; for example, private tenants #1 and #2 1112*a*, 1112*b* and resale tenants #1 and #2 1112*c*, 1112*d*. Private availability zone #2 contains, for example, two private tenants 1112*e*, 1112*i* and three resale tenants 1112*f*-1112*h*. Private cloud #N 1008*b* includes, for example, one private availability zone 1010*c* having one resale tenant 1112*j* and three private tenants 1112*k*-1112*m*.

In embodiments, an availability zone may be a physical instance of a private cloud. For example, as shown in FIG. 1, private cloud #N 1008*b* is shown to contain a single availability zone. Thus, there exists only one physical instance of private cloud #N. On the other hand, private cloud #1 1008*a* has two availability zones 1010*a*, 1010*b*. Thus, there exist two physical instances of private cloud #1 1008*a*. In embodiments, each physical instance may constitute a separate data center, each in different locations. For example, private cloud #1 1008*a* could be the private data cloud of a multi-national corporation having data centers, for example in North America and Asia.

It can be seen that the Composite Public Cloud 1002 may contain, for example public availability zones #1-3 1004*a*-1004*c*, each of which contains at least one of public tenants 1006*a*-1006*f*. As shown, the public tenants in the Composite Public Cloud 1002 are virtual or logical entities that are created by mapping resale tenants from private availability zones within private clouds 1-N, thereby aggregating the resale tenants to form a virtual Composite Public Cloud 1002.

It is to be understood then, that, while tenants are a logical separation, availability zones represent a physical separation. Thus, an availability zone may be thought of as a super set of tenants.

In contrast to the Composite Public Cloud described herein, a public cloud is one based on the conventional cloud computing model, in which a service provider makes resources, such as applications and storage, available to the general public over a publicly-available network such as the Internet. Public cloud services may be free or may be offered on a pay-per-usage model. The public cloud is exemplified by such IaaS offerings as AMAZON WEB SERVICES, which is, in effect, a public cloud, segregated into multiple data centers. Thus, when a client purchases compute time from Amazon, he or she may specify, "I want my virtual server to sit within the Amazon East Coast or West Coast or European data center." By placing that compute in these different availability zones, the client is, basically, placing that virtual machine in different instances of AMAZON's cloud.

Multitenancy

One of the important aspects of infrastructure as a service (IaaS) is that it is multi-tenant, thus providing the ability to logically segregate computing resources from each other within the same cloud, effectively filtering traffic between different members of the same cloud and specifying rules for how that traffic should flow.

Thus, if one were to build a private cloud having fifty physical servers, and within those fifty physical servers there were two virtual servers on each physical server, the resulting cloud would number a hundred virtual servers (on the fifty physical servers). In an exemplary IaaS offering, the service provider might segregate that cloud into two virtual tenants, each tenant having fifty virtual machines. From the point of view of cloud computing, the service provider can make rules that say, for example, that he would only allow Web traffic between these two tenants, or only allow e-mail traffic between these two tenants. Thus, such rules can be put into place at a protocol level.

Therefore, the attribute of multi-tenancy is the basis for a marketplace in which a portion of the tenants defined within a managed private cloud customers are made available for resale. Thus, the multi-tenancy capability for a given private cloud allows the cloud owner to sell compute to, for example, two or three customers via the marketplace, and to segregate those two or three customers on their own tenant space—protecting them from each other, but also protecting the managed private cloud corporate customer from what amounts to foreign compute coming in through the brokerage.

One might realize based on the foregoing, that the Composite Public Cloud is, in fact, not a cloud. In one embodiment, the Composite Public Cloud is actually a portal that is constructed to have the look and feel of a public cloud. As a customer of the Composite Public Cloud, one would visit the Composite Public Cloud portal and, for example, submit a virtual machine that one wanted pushed out to the Composite Public Cloud to be offered for sale. By means of the portal, the Composite Public Cloud provider depicts each of those managed private clouds as availability zones in the Composite Public Cloud. Multi-tenancy and the concept of the availability zone are, thus, extremely useful in describing the Composite Public Cloud to prospective compute sellers and to prospective compute buyers.

Figure 2:
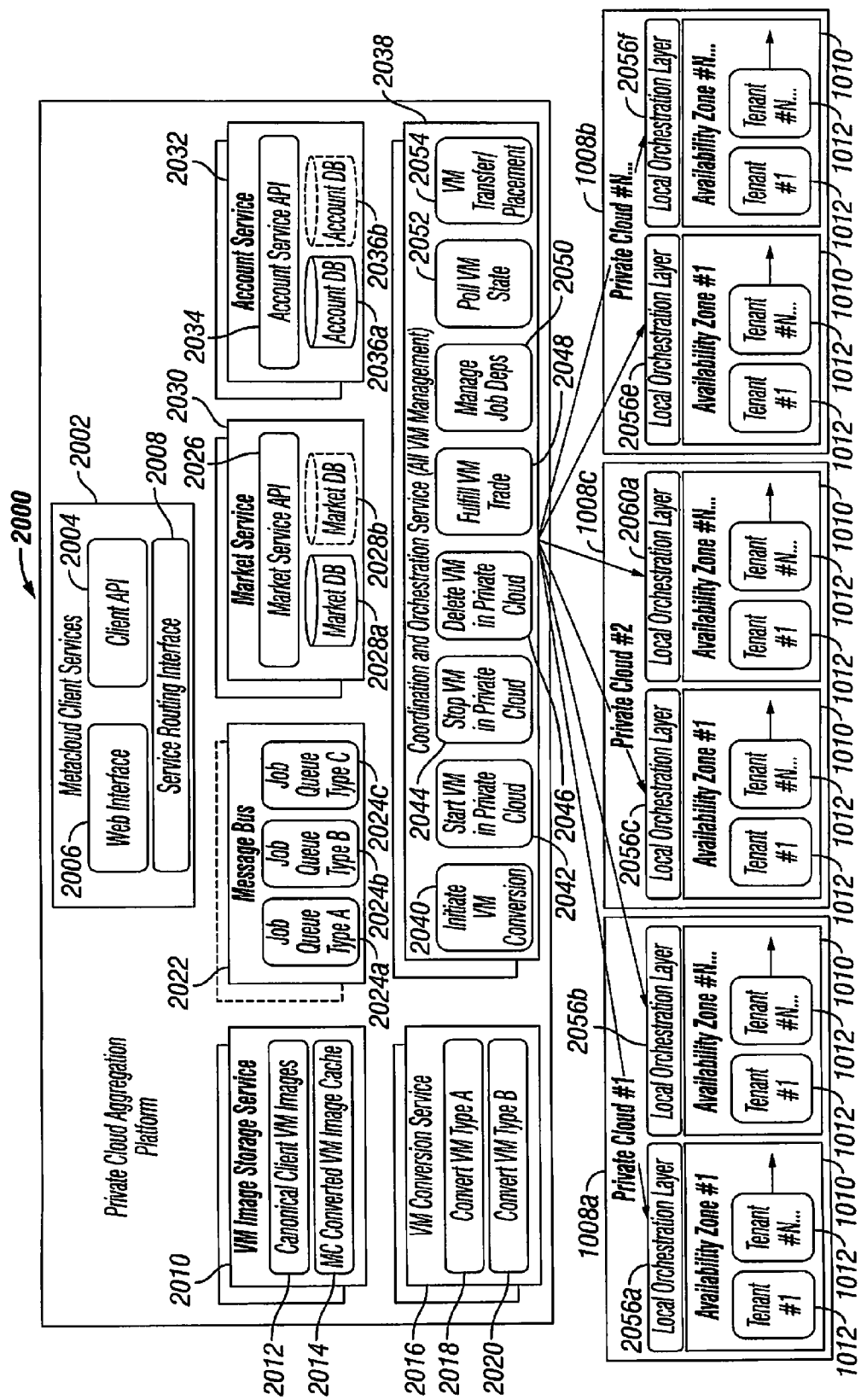
FIG. 2 provides a diagram of a private cloud aggregation platform

Turning now to FIG. 2, shown is a schematic diagram of a private cloud aggregation platform 2000, embodiments of which serve to implement the logical private cloud aggregation 1000 described herein above. Embodiments of the private cloud aggregation platform 2000 will include at least one of the following components:
Meta cloud client services 2002;
Client API 2004: Programmatic interface providing a super-set of the Web Interface portal;
Web interface 2006: Consumer-facing portal for the consumption of public cloud compute;
Service routing interface 2008:
VM image storage service 2010: storage medium, local or remote that holds the base images of the VMs;
Canonical Client VM images 2012: repository for unmodified VM images submitted via the client portal;
MC converted VM image cache 2014: repository for the resultant converted VM image, if modification is warranted for the target private cloud
VM conversion service 2016: responsible for VM transformations when destination private cloud format differs from origin VM image format for example:
AMI (AMAZON MACHINE IMAGE);
VMDK, (VIRTUAL MACHINE DISK FORMAT);
OVA (OPEN VIRTUALIZATION ALLIANCE):
OVF (OPEN VIRTUALIZATION FORMAT);
QCOW2 (QEMU COPY ON WRITE 2);
RAW (raw hard drive image);
Minor VM image "fix-up" routines occur here also;
Convert VM type A 2018;
Convert VM type B 2020;
Message bus 2022: scalable message transport abstraction. Handles inter-service communication and message queuing;
Job queue 2024a-2024c;
Market service 2030: All financial exchange data resides here. Canonical source for global contract state. This is the system of record when compute lots are bought/sold/traded/etc. Inventory and pricing detail also reside here;
Market service API 2026;
Market database 2028a-2028b;
Account service 2032: canonical source for consumer/client credentials, authentication data, permissions, entitlements. Allows for single sign-on across Metacloud platform;
Account service API 2034;
Account DB2036a-2036b
Coordination and orchestration service (all VM management) 2038: intermediary between the Metacloud platform and the global private cloud pool. Central service ultimately controls private cloud VM state by interacting with each private cloud's local orchestration services;
Initiate VM conversation 2040;
Start VM in private cloud 2042;
Stop VM in private cloud 2044;
Delete VM in private cloud 2046;
Fulfill VM trade 2048;
Manage job deps 2050;
Pol VM state 2052;
VM transfer/placement 2054;
Private cloud 1-3 1008a-1008c;
Local orchestration layer 2056a-2056f;
Availability zone 1010; and
Tenants 1012.

Figure 3:
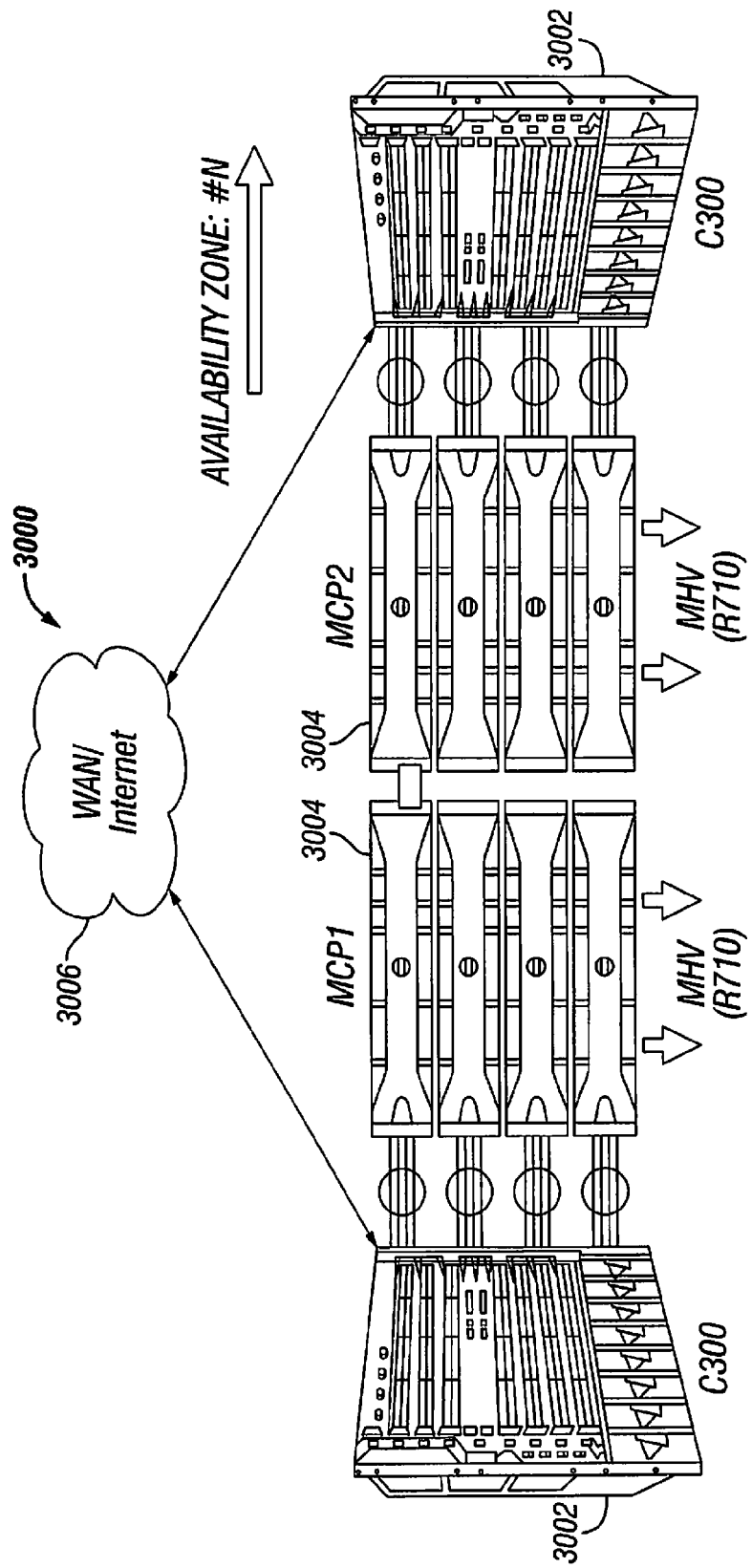
FIG. 3 provides a hardware diagram of an exemplary availability zone.

As previously indicated, the physical infrastructure of a cloud is, in essence, commodity hardware—regular physical servers, disks, storage, and network switches, with a software overlay and virtually carved up to be presented as whatever housed within data centers of varying size, from small data centers having only a few servers to large data centers having thousands of servers. Referring now to FIG. 3, shown is a representation of an exemplary data center 3000. As previously described, a single data center is ordinarily represented within the cloud as an availability zone. As shown in FIG. 3, the data center 3000 includes, typically, a number of servers. Here, there are two server racks 3004, each containing four rack servers, for a total of eight servers. Each server is a DELL POWEREDGE R701 rack server (DELL, Inc., Roundrock Tex.). Each server, in turn, is communicatively coupled to a network switch 3002. Here, each network switch is a DELL FORCE 10 chassis-based switch (DELL, Inc., Roundrock Tex.). Each of the switches is communicatively coupled to the cloud 3006, either directly to the Internet or via a network such as a WAN (wide-area network).

One of ordinary skill will recognize that the above description is exemplary only. As above, a data center may house only a few servers or it may house many thousands. Additionally, because a data center may be built completely from commodity hardware, there may exist thousands of component configurations using commodity hardware supplied by a vast number of manufacturers.

Referring back to the previous example of the fifty physical servers in a corporate private cloud, the servers are typically off-the-shelf commodity X86 base servers. Two servers may be allocated as cloud controllers, tasked with the role of handling orchestration, collaboration and management of compute across the remaining servers. The remaining servers in that cloud are hypervisors. The person of ordinary skill will recognize that "hypervisor" is an industry-standard term for software that allows for the creation of one or more virtual machines on top of a real physical machine. In an exemplary embodiment, the hypervisor used is KVM (Kernel-based virtual machine). It will be appreciated however that other hypervisors may be used. Then each of the fifty physical servers is communicatively coupled to a commodity network switch, as shown in FIG. 3.

While a full virtual service-oriented infrastructure may include a wide array of technologies that provide resource aggregation, management, availability and mobility, the hypervisor may be seen as the foundational core of virtual infrastructure.

Using the foregoing software/hardware architecture enables virtualization of all of the computing, allowing creation of as many virtual servers as desired. Additionally, network routing relationships between the different tenants may also be dynamically defined.

Figure 4:
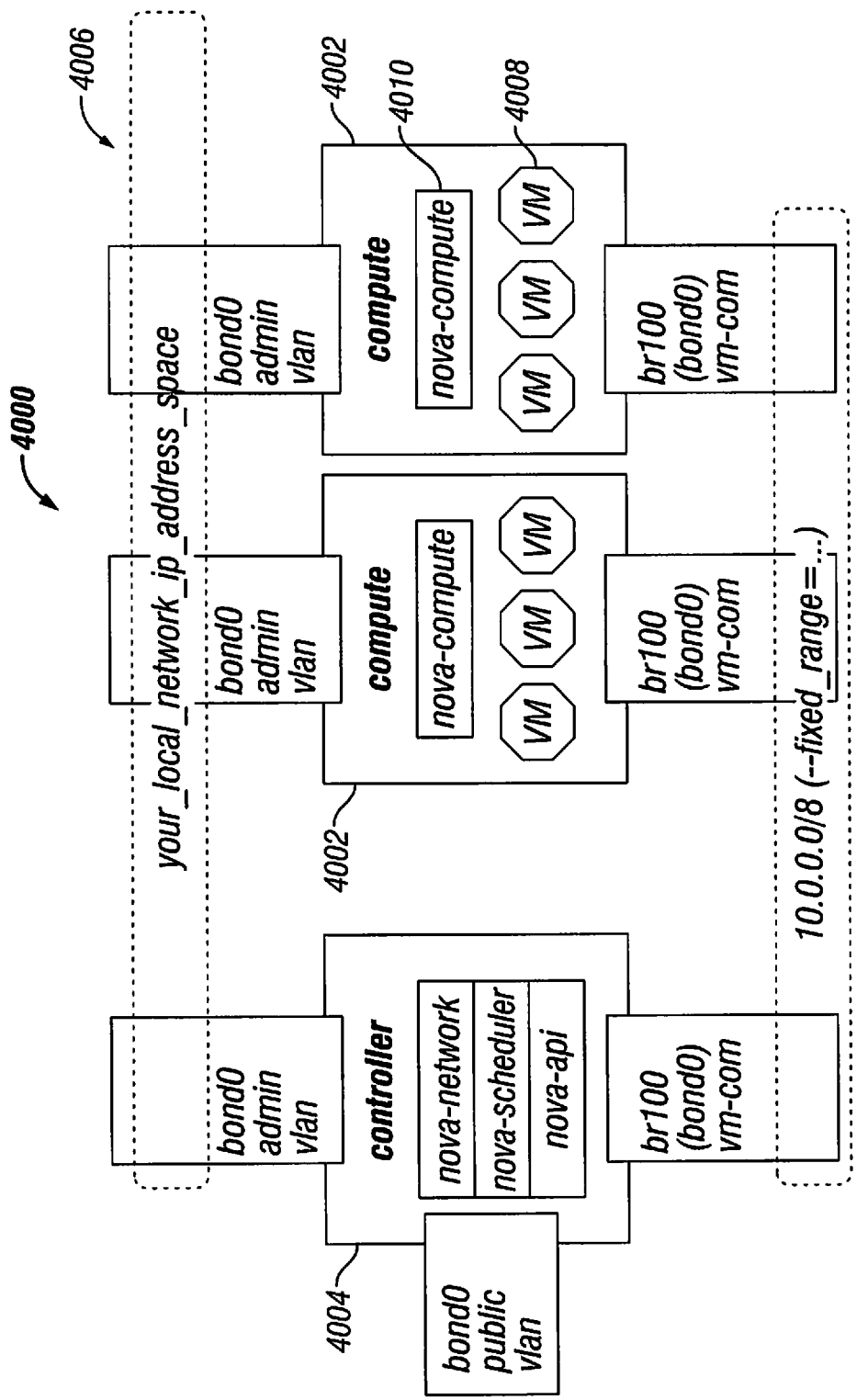
FIG. 4 provides an architecture diagram of an availability zone.

FIG. 4 illustrates the hardware/software architecture described herein above. A data center 4000 includes a number of servers 4002, 4004. One of the servers is allocated as a cloud controller 4004. The remaining servers 4002 are configured as hypervisors, each of them running an instance 4010 of the hypervisor software. In turn, each of the hypervisors 4002 is configured as multiple virtual machines 4008.

As mentioned previously, the virtualization software may include a user dashboard from which customized views and user interfaces may be created. FIGS. 5 and 6 show views created from the dashboard. FIG. 5 shows a billing overview 5000 that includes a tenant billing summary 5002. FIG. 6 shows a tenant summary 6000 that includes an 'active instant usage summary' 6002 and a 'terminated instant usage summary' 6004.

Figure 7:
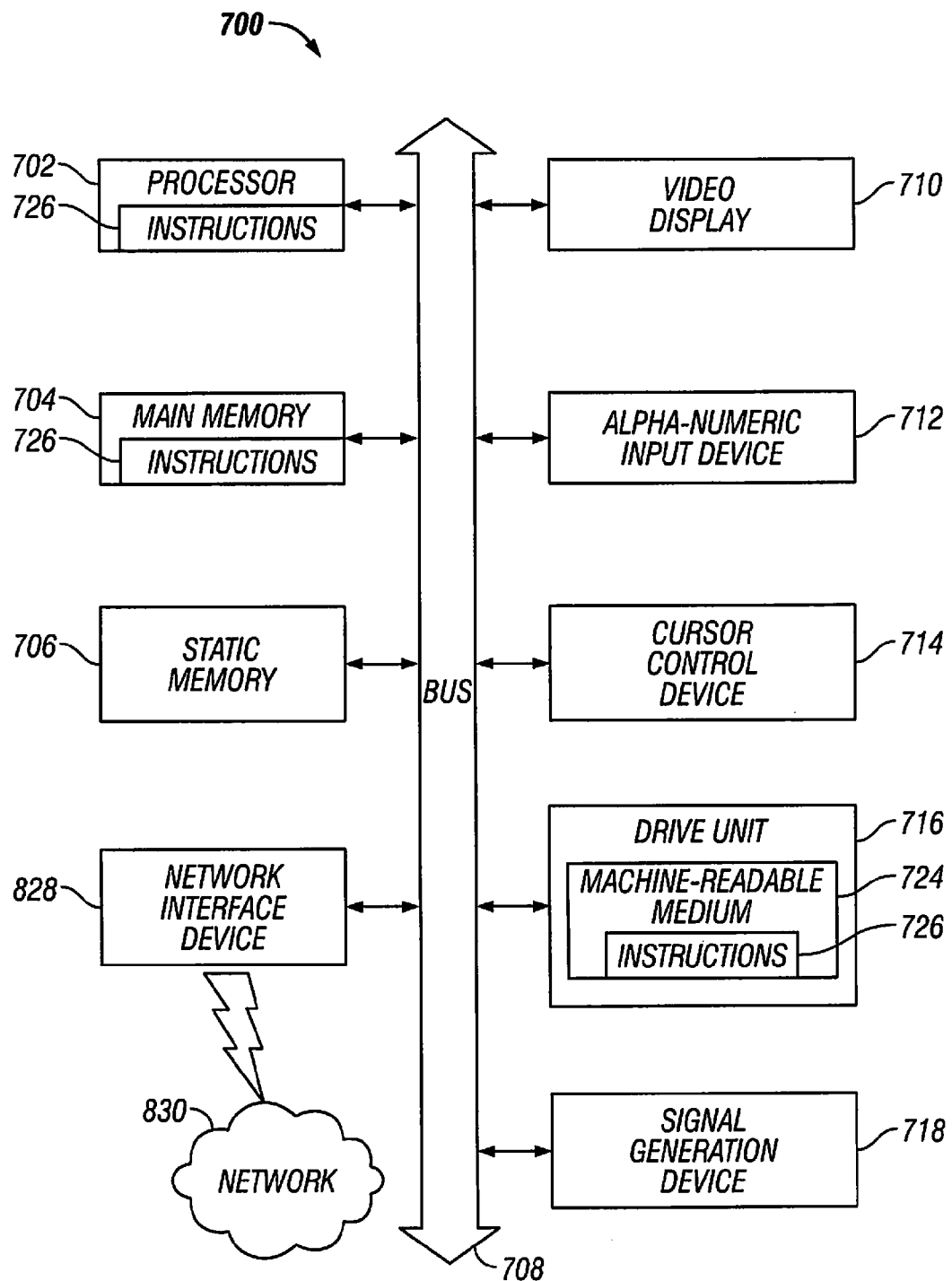
FIG. 7 provides a diagram of a machine in the exemplary form of a computer platform within which a set of instructions, for causing the machine to perform any one of the methodologies discussed herein below, may be executed.

Referring now to FIG. 7, shown is a diagrammatic representation of a machine in the exemplary form of a computer platform 700 within which a set of instructions for causing the machine to perform any one of the methodologies discussed herein below may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine.

The computer platform 700 includes a processor 702, a main memory 704 and a static memory 706, which communicate with each other via a bus 708. The computer platform 700 may further include a display unit 710, for example, a liquid crystal display (LCD) or a cathode ray tube (CRT). The computer platform 700 also includes an alphanumeric input device 712, for example, a keyboard; a cursor control device 714, for example, a mouse; a disk drive unit 716, a signal generation device 718, for example, a speaker, and a network interface device 828.

The disk drive unit 716 includes a machine-readable medium 724 on which is stored a set of executable instructions, i.e. software, 726 embodying any one, or all, of the methodologies described herein below. The software 726 is also shown to reside, completely or at least partially, within the main memory 704 and/or within the processor 702. The software 726 may further be transmitted or received over a network 830 by means of a network interface device 828.

In contrast to the platform 700 discussed above, a different embodiment uses logic circuitry instead of computer-executed instructions to implement processing offers. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large scale integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like. It is to be understood that embodiments of this invention may be used as or to support software programs executed upon some form of processing core (such as the Central Processing Unit of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information. Additionally, a "machine-readable medium" may be understood to mean a "non-transitory" machine-readable medium.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A system for creating a composite public cloud in a cloud-computing environment comprising:
   a bus;
   a processor coupled to the bus; and
   a memory medium coupled to the bus, the memory medium comprising instructions for:
      creating a plurality of tenants in at least one availability zone of at least one private cloud, wherein an availability zone comprises a physical instance of said private cloud and wherein a tenant comprises a virtual representation of certain compute resources situated within an availability zone;
      allocating a portion of said tenants as a 'resale' tenant;
      associating a description to each resale tenant; and
      aggregating all of said resale tenants into a composite public cloud,
   wherein aggregating all of said resale tenants into a composite public cloud comprises:
      registering at least one resale tenant on a facility for transferring commoditized excess compute resources,
      mapping each resale tenant to a public tenant within a public availability zone in a virtualized public cloud, and
      publishing said description of said registered resale client.

2. The system of claim 1, wherein said physical instance comprises a plurality of servers and associated storage, each of said servers having resident thereon an instance of a hypervisor application, said hypervisor application operative to virtualize said server so that each server is represented as at least one virtual machine; and
   wherein a tenant comprises at least one virtual machine.

3. The system of claim 1, wherein associating a description to each resale tenant comprises:
   describing said resale tenant according to one or more predetermined attributes, said predetermined attributes including at least:
   start of availability;
   grace period;
   cost; and
   minimal duration.

4. A system for creating a composite public cloud in a cloud-computing environment comprising:
   a bus;
   a processor coupled to the bus; and
   a memory medium coupled to the bus, the memory medium comprising instructions for:
      creating a plurality of tenants in at least one availability zone of at least one private cloud, wherein an availability zone comprises a physical instance of said private cloud and wherein a tenant comprises a virtual representation of certain compute resources situated within an availability zone;
      allocating a portion of said tenants as a 'resale' tenant;
      associating a description to each resale tenant;
      aggregating all of said resale tenants into a composite public cloud;

logically segregating computing resources from each other within the same cloud, to filter traffic between different members of the same cloud; and specifying rules for how that traffic should flow.

5. The system of claim 4, wherein said physical instance comprises a plurality of servers and associated storage, each of said servers having resident thereon an instance of a hypervisor application, said hypervisor application operative to virtualize said server so that each server is represented as at least one virtual machine; and wherein a tenant comprises at least one virtual machine.

6. The system of claim 4, wherein associating a description to each resale tenant comprises:

describing said resale tenant according to one or more predetermined attributes, said predetermined attributes including at least:

start of availability;

grace period;

cost; and minimal duration.

7. A system for creating a composite public cloud in a cloud-computing environment comprising:

a bus;

a processor coupled to the bus; and a memory medium coupled to the bus, the memory medium comprising instructions for:

creating a plurality of tenants in at least one availability zone of at least one private cloud, wherein an availability zone comprises a physical instance of said private cloud and wherein a tenant comprises a virtual representation of certain compute resources situated within an availability zone;

allocating a portion of said tenants as a 'resale' tenant;

associating a description to each resale tenant;

aggregating all of said resale tenants into a composite public cloud;

establishing a portal for buying and selling commoditized excess compute resources;

automatically matching buyers and sellers by means of said portal; and conducting speculative trading of commoditized excess compute resources.

8. The system of claim 7, wherein said physical instance comprises a plurality of servers and associated storage, each of said servers having resident thereon an instance of a hypervisor application, said hypervisor application operative to virtualize said server so that each server is represented as at least one virtual machine; and wherein a tenant comprises at least one virtual machine.

9. The system of claim 7, wherein associating a description to each resale tenant comprises:

describing said resale tenant according to one or more predetermined attributes, said predetermined attributes including at least:

start of availability;

grace period;

cost; and minimal duration.

10. A computer-implemented method for creating a composite public cloud in a cloud-computing environment comprising:

a computing device creating a plurality of tenants in at least one availability zone of at least one private cloud, wherein an availability zone comprises a physical instance of said private cloud and wherein a tenant comprises a virtual representation of certain compute resources situated within an availability zone;

a computing device allocating a portion of said tenants as 'resale' tenants;

a computing device associating a description to each resale tenant; and a computing device aggregating all of said resale tenants into a composite public cloud, wherein aggregating all of said resale tenants into a composite public cloud comprises:

a computing device registering at least one resale tenant on a portal for trading computing resources;

a computing device mapping each resale tenant to a public tenant within a public availability zone in said composite public cloud; and a computing device publishing said description of said registered resale client.

11. The method of claim 10, wherein said physical instance comprises a plurality of servers and associated storage, each of said servers having resident thereon an instance of a hypervisor application, said hypervisor application operative to virtualize said server so that each server is represented as at least one virtual machine; and wherein a tenant comprises at least one virtual machine.

12. The method of claim 10, wherein associating a description to each resale tenant comprises:

a computing device describing said resale tenant according to one or more predetermined attributes, said predetermined attributes including at least:

start of availability;

grace period;

cost; and minimal duration.

13. A computer-implemented method for creating a composite public cloud in a cloud-computing environment comprising:

a computing device creating a plurality of tenants in at least one availability zone of at least one private cloud, wherein an availability zone comprises a physical instance of said private cloud and wherein a tenant comprises a virtual representation of certain compute resources situated within an availability zone;

a computing device allocating a portion of said tenants as 'resale' tenants;

a computing device associating a description to each resale tenant;

a computing device aggregating all of said resale tenants into a composite public cloud;

a computing device logically segregating computing resources from each other within the same cloud, to filter traffic between different members of the same cloud; and a computing device specifying rules for how that traffic should flow.

14. The method of claim 13, wherein said physical instance comprises a plurality of servers and associated storage, each of said servers having resident thereon an instance of a hypervisor application, said hypervisor application operative to virtualize said server so that each server is represented as at least one virtual machine; and wherein a tenant comprises at least one virtual machine.

15. The method of claim 13, wherein associating a description to each resale tenant comprises:

a computing device describing said resale tenant according to one or more predetermined attributes, said predetermined attributes including at least:

start of availability;

grace period;

cost; and minimal duration.

16. A computer-implemented method for creating a composite public cloud in a cloud-computing environment comprising:
- a computing device creating a plurality of tenants in at least one availability zone of at least one private cloud, wherein an availability zone comprises a physical instance of said private cloud and wherein a tenant comprises a virtual representation of certain compute resources situated within an availability zone;
- a computing device allocating a portion of said tenants as 'resale' tenants;
- a computing device associating a description to each resale tenant;
- a computing device aggregating all of said resale tenants into a composite public cloud;
- a computing device establishing a portal for buying and selling commoditized excess compute resources;
- a computing device matching buyers and sellers by means of said portal; and
- a computing device conducting speculative trading of commoditized excess compute resources.

17. The method of claim 16, wherein said physical instance comprises a plurality of servers and associated storage, each of said servers having resident thereon an instance of a hypervisor application, said hypervisor application operative to virtualize said server so that each server is represented as at least one virtual machine; and
wherein a tenant comprises at least one virtual machine.

18. The method of claim 16, wherein associating a description to each resale tenant comprises:
- a computing device describing said resale tenant according to one or more predetermined attributes, said predetermined attributes including at least:
- start of availability;
- grace period;
- cost; and
- minimal duration.

* * * * *